United States Patent
Xu

(10) Patent No.: US 8,368,792 B2
(45) Date of Patent: Feb. 5, 2013

(54) IMAGER METHODS, APPARATUSES, AND SYSTEMS PROVIDING A SKIP MODE WITH A WIDE DYNAMIC RANGE OPERATION

(75) Inventor: Chen Xu, Boise, ID (US)

(73) Assignee: Micron Technology, Inc., Boise, ID (US)

(*) Notice: Subject to any disclaimer, the term of this patent is extended or adjusted under 35 U.S.C. 154(b) by 105 days.

(21) Appl. No.: 13/097,279

(22) Filed: Apr. 29, 2011

(65) Prior Publication Data

US 2011/0199522 A1    Aug. 18, 2011

Related U.S. Application Data

(62) Division of application No. 11/890,507, filed on Aug. 7, 2007, now Pat. No. 7,956,914.

(51) Int. Cl.
  *H04N 3/14* (2006.01)
  *H04N 5/335* (2011.01)
  *H04N 1/04* (2006.01)

(52) U.S. Cl. ........ 348/302; 348/308; 348/294; 348/296; 358/482

(58) Field of Classification Search .............. 348/207.99, 348/294–324; 358/482–483
See application file for complete search history.

(56) References Cited

U.S. PATENT DOCUMENTS

| | | | |
|---|---|---|---|
| 6,972,791 B1 * | 12/2005 | Yomeyama | ................ 348/230.1 |
| 6,975,355 B1 | 12/2005 | Yang et al. | |
| 7,020,353 B1 | 3/2006 | McCaffrey et al. | |
| 7,079,178 B2 | 7/2006 | Hynecek | |
| 7,956,914 B2 * | 6/2011 | Xu | ................ 348/302 |
| 2002/0113886 A1 | 8/2002 | Hynecek | |
| 2004/0041927 A1 | 3/2004 | Cho et al. | |
| 2005/0078205 A1 | 4/2005 | Hynecek | |
| 2005/0151866 A1 * | 7/2005 | Ando et al. | ................ 348/297 |
| 2006/0011810 A1 | 1/2006 | Ando et al. | ................ 250/208.1 |
| 2006/0181625 A1 | 8/2006 | Han et al. | |
| 2006/0187329 A1 * | 8/2006 | Panicacci | ................ 348/308 |

FOREIGN PATENT DOCUMENTS

| | | |
|---|---|---|
| EP | 1 233 613 A2 | 8/2002 |
| EP | 1 734 747 A1 | 12/2006 |
| WO | WO 98/14002 | 4/1998 |
| WO | WO 99/34592 | 7/1999 |
| WO | WO 01/10110 A2 | 2/2001 |
| WO | WO 2006/113271 | 10/2006 |

OTHER PUBLICATIONS

Fossum, Eric, CMOS Image Sensors: Electronic Camera on a Chip, IEEE, IEEE Transactions on Electron Devices, Vo. 44, No. 10, Oct. 1997, pp. 1689-1698.

Shrey, O., Huppertz, J., Filimonovic, G., Bussman, A, Brockherde, W., Hosticka, B.J., A 1 Kx1 K High Dynamic Range CMOS Image Sensor With On-Chip Programmable Region-of-Interest Readout, , Fraunhofer-Inst of Microelectron. Circuits and Syst., Duisburg, Solid State Circuits, IEEE Journal, Jul. 2002, Vo. 17, Issue 7, pp. 911-915.

(Continued)

*Primary Examiner* — Lin Ye
*Assistant Examiner* — Marly Camargo
(74) *Attorney, Agent, or Firm* — Dickstein Shapiro LLP

(57) ABSTRACT

Methods, apparatuses and systems provide a high dynamic range mode of operation for an image sensor when operating in a skip mode where certain pixels of an array are not readout. Multiple integration periods are employed in the skip mode with selected pixels being readout through circuits associated with pixels that are not readout.

20 Claims, 14 Drawing Sheets

OTHER PUBLICATIONS

Nomoto, T., Hosokai, S., Isakawa, T., Hyuga, R., Nakajima S., A 4 M-Pixel CMD Image Sensor With Block and Skip Access Capability, Corp Res Div Olympus Opt. Co. Ltd. Nagano, IEEE Transaction on Electron Devices, Oct. 1997, vol. 44, Issue 10, pp. 1738-1746.

Abdallah S., Saleh, B., Aboulsoud, J.K., A General Overview of Solid State Imaging Sensors Types, Photonics and Its Application at Egyptian Engineering Faculties and Institutes, 2002, Third Workshop, 2002, pp. 1-10.

* cited by examiner

IMAGER METHODS, APPARATUSES, AND SYSTEMS PROVIDING A SKIP MODE WITH A WIDE DYNAMIC RANGE OPERATION

CROSS REFERENCE TO RELATED APPLICATION

The present application is a divisional of U.S. patent application Ser. No. 11/890,507, filed Aug. 7, 2007 now U.S. Pat. No. 7,956,914, the disclosure of which is incorporated by reference in its entirety.

FIELD OF THE INVENTION

Embodiments of the invention relate generally to image sensors and more particularly, to wide dynamic range image sensors.

BACKGROUND OF THE INVENTION

Image sensors, such as complementary metal oxide semiconductors (CMOS), include a focal plane array of pixels. Each pixel in a CMOS image sensor, for instance, includes a photosensor, such as, a photogate, a photoconductor or a photodiode overlying a substrate. A readout circuit is provided for each pixel and includes at least a source follower transistor and a row select transistor for coupling the source follower transistor to a column output line. A pixel also typically has a floating diffusion region, connected to a gate of the source follower transistor.

A pixel's photosensor collects photons (incoming light) and converts the photons into an electrical charge. The image sensor may also include a transfer transistor for transferring the electrical charge generated by the photosensor to the floating diffusion region and a reset transistor for resetting the floating diffusion region to a predetermined charge level prior to charge transference. The source follower transistor converts the charge stored at the floating diffusion region into two electrical output signals Vrst, representing the reset state of the floating diffusion region, and Vsig, representing the electrical charge generated by the photosensor. The output signals Vrst, Vsig are subtracted and typically amplified to a signal level for further processing by an analog-to-digital converter (ADC) which produces a digital value used to produce a digital image.

The quality of the final digital image depends on many factors, one of which is the dynamic range of the image sensor. The dynamic range of an image sensor is defined by the largest possible signal in relation to the smallest possible signal the image sensor can generate. The largest possible signal being proportional to the full well capacity of a pixel, i.e., the total amount of photons that the pixel can convert to electrons. The smallest possible signal is the noise level when the image sensor is not exposed to any light, that is generally referred to as the noise floor. Therefore, to capture the full dynamic range of a scene, that is capturing both shadow and highlight detail, an image sensor should have a wide dynamic range.

Applications, for example digital cameras, with imager sensors generally require a high dynamic range of at least 120 dB to capture the scene illuminations ranges (e.g., from $10^{-1}$ lux for dark scenes to $10^5$ lux for scene having bright sunlight or direct headlights). Typical CMOS image sensors are unable to attain this high dynamic range due to the limitations of the full well and noise floor. Typical CMOS image sensors have a dynamic range of around 70 dB. Consequently, a typical image sensor will generally be unable to capture all details from deep shadows to bright highlights of a scene.

Image sensors can also include built in skip modes in which pixels in certain columns and rows of an array are not readout. Skip modes are used to readout only a portion of an image array which decreases the readout time but also reduces output resolution in a given field of view. Typical column skip mode operations, however, will leave a substantial part of the column readout circuit unused, e.g., half and three-fourths for "2×" and "4×" skip modes, respectively. It would be advantageous to utilize the unused channels of the readout circuit during skip mode readout operation of an imager pixel array.

DETAILED DESCRIPTION OF THE INVENTION

Figure 1:
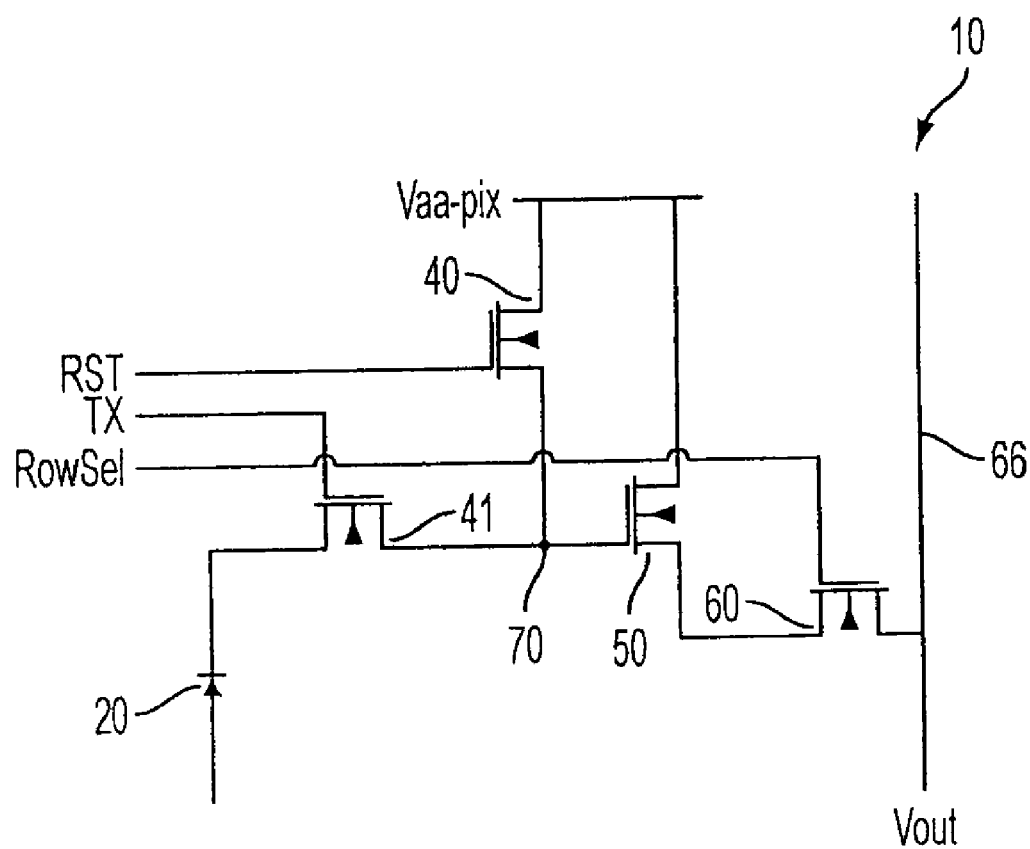
FIG. 1 is schematic diagram of a conventional image sensor pixel.

In the following detailed description, reference is made to the accompanying drawings, which form a part hereof and illustrate specific embodiments in which the invention may be practiced. In the drawings, like reference numerals describe substantially similar components throughout the several views. These embodiments are described in sufficient detail to enable those skilled in the art to practice them, and it is to be understood that other embodiments may be utilized, and that structural, logical and electrical changes may be made.

The term "pixel" refers to a picture element unit cell containing at least a photosensor for converting electromagnetic radiation to an electrical signal. For purposes of illustration, a representative pixel is illustrated in the figures and description herein, and typically fabrication of all pixels in a pixel array will proceed simultaneously in a similar fashion.

Figure 8:
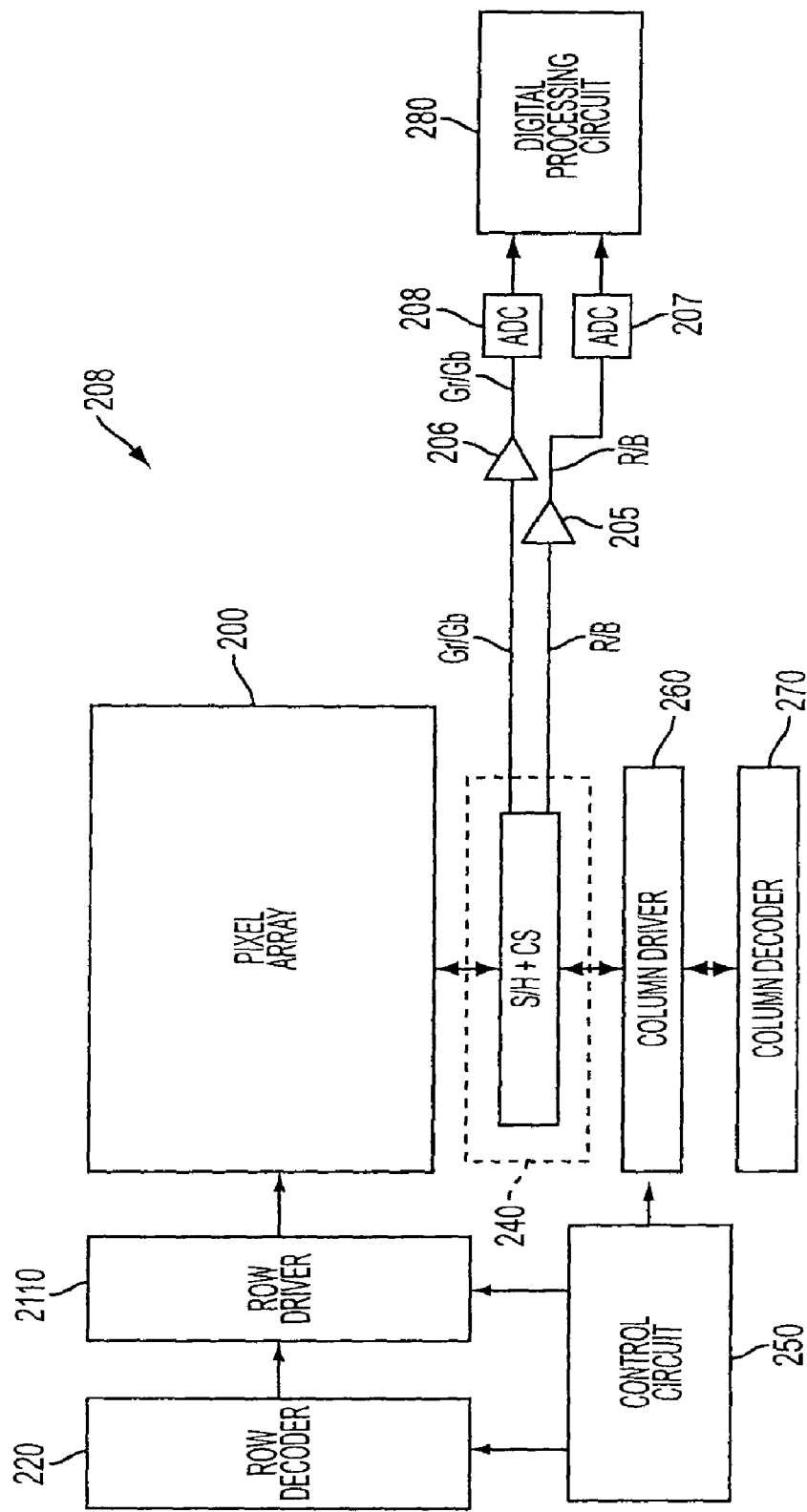
FIG. 8 is a block diagram of a CMOS image sensor.

Although the following embodiments are described herein with reference to the architecture of one pixel, it should be understood that this is representative of a plurality of pixels in an array of an imager device such as a pixel array 200 (FIGS. 2, 5) of an image sensor 208 (FIG. 8). In addition, although the embodiments are described below with reference to a CMOS image sensor, they have applicability to other solid state imaging devices having a pixel array with column readout of the pixels. The following detailed description is, therefore, not to be taken in a limiting sense.

As described below in more detail below, the embodiments discussed herein relate to an imager having a pixel array where each column of the pixel array is connected to respective readout circuitry. When a skip mode of the imager is enabled, certain rows and columns of the array are not readout, leaving the readout circuitry for the unread columns unused. However, in embodiments described herein at least a first and second integration times are used to increase dynamic range of the image array and charge collected during an additional integration time can be readout through the column readout circuits that are unused because of the enabled skip mode.

Referring now to the drawings, where like elements are designated by like reference numerals, FIG. 1 illustrates a conventional four-transistor CMOS imager pixel, including a photosensor 20, e.g., a pinned photodiode, transfer transistor 41, reset transistor 40, source follower transistor 50, row select transistor 60, charge storage region 70, and an output column line 66. The photosensor 20 is connected to a source/drain terminal of the transfer transistor 41. The gate of the transfer transistor 41 is controlled by a transfer control signal TX. While the transfer transistor 41 is in the "off" state, charge generated from light impinging upon the photosensor 20 accumulates within the photosensor 20.

When the transfer transistor 41 is switched to the "on" state by the transfer control signal TX, the accumulated charge in the photosensor 20 is transferred to the storage region 70. The storage region 70 is connected to a gate of the source follower transistor 50. The source follower transistor 50 receives power Vaa-pix from a line connected to a voltage source and amplifies the signal received from the storage region 70 for readout. Storage region 70 may be constructed as a floating diffusion region. The pixel 10 is selected for readout by a RowSel signal, which controls the row select transistor 60. When the row select transistor 60 is switched to the "on" state, the amplified signal from the source follower transistor 50 is transferred to the output column line 66 as an output voltage Vout, which as noted earlier, can be Vrst for an outputted voltage representing the reset state of the storage region 70 set by turning on reset transistor 40 with the signal RST, or Vsig for an output voltage representing the signal generated by the photosensor collected charge transferred to storage region 70 by transfer gate 41. The storage region 70 may be reset to a known voltage by the reset transistor 40, when activated by a reset control signal RST, in preparation for a photosensor 20 readout sequence.

The integration time for photosensor 20 begins when charge starts to accumulate in the photosensor 20 and ends when the transfer transistor 41 is switched to the "on" state and the accumulated charge is transferred from the photosensor 20 to the storage region 70.

Figure 10:
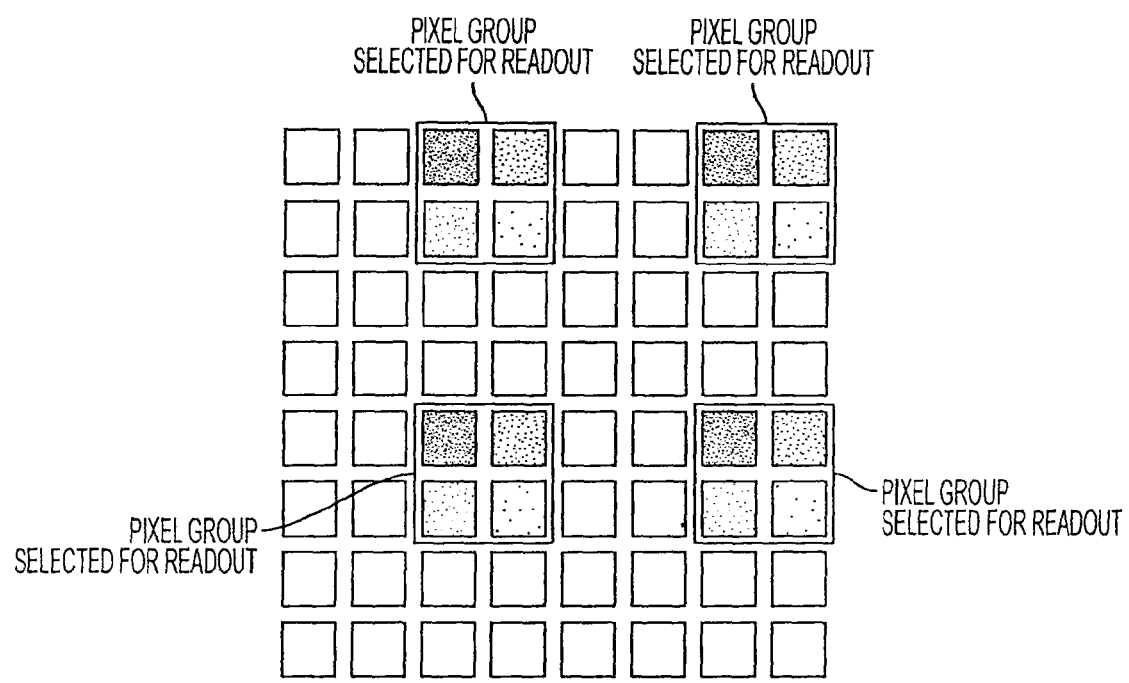
FIG. 10 illustrates an example of the pixels readout when a "2×" skip mode is implemented.
Figure 11:
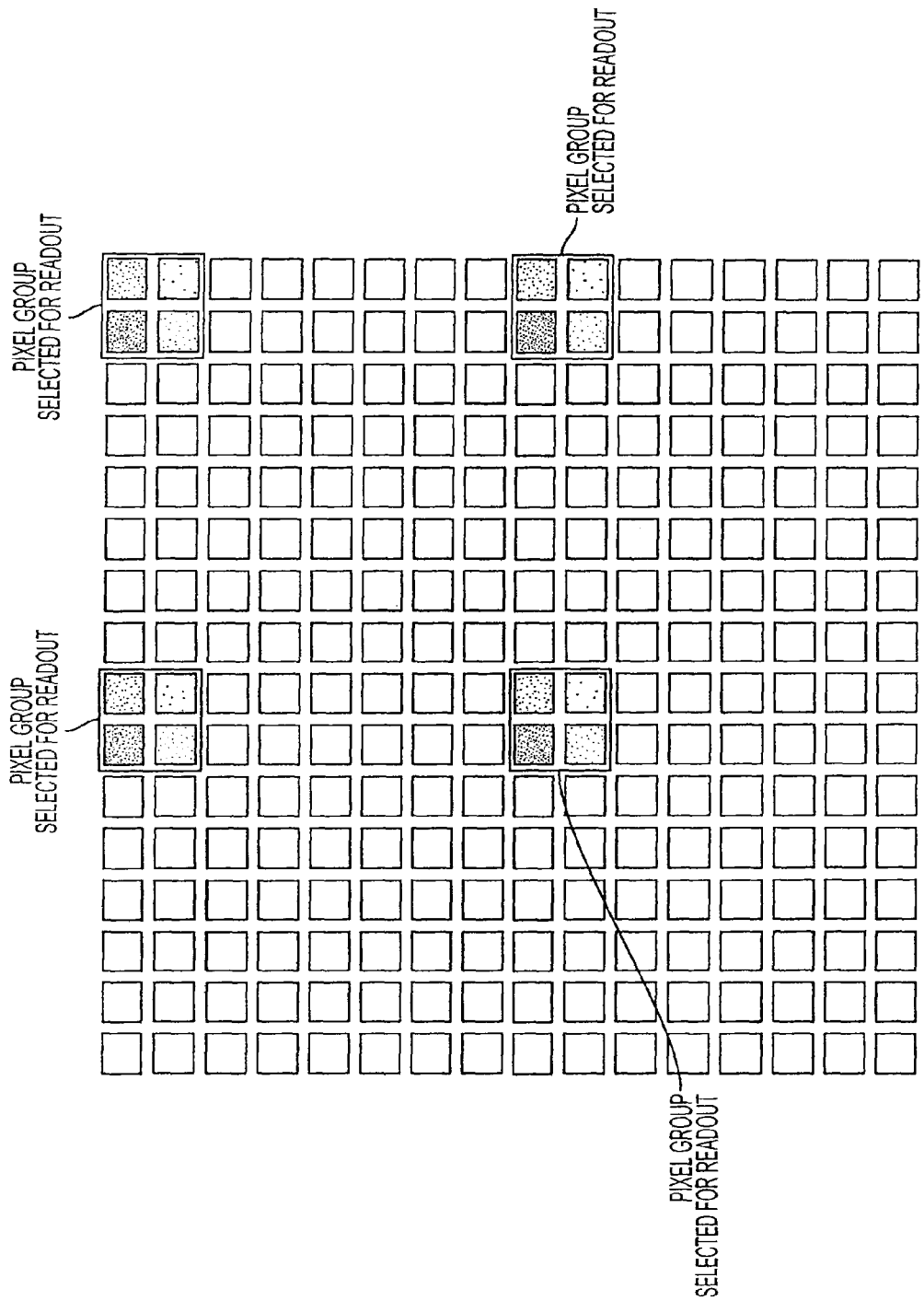
FIG. 11 illustrates an example of the pixels readout when a "4×" skip mode is implemented.

As discussed above, image sensors can include built in skip modes in which pixels in certain columns and rows of an array are not readout. If an imager is operating in skip mode, only a portion of an image array is readout. FIG. 10 illustrates a portion of an image sensor 208 pixel array 200 utilizing a "2×" skip mode. The four darkened pixels, representing color pixels R, Gr, B and Gb, form a pixel group which are the pixels which are readout. For each pixel group, one group is read out while the next group of the same R, Gr, B, Gb color pixels in both the x and y directions are not readout. FIG. 11 illustrates a portion of an image sensor 208 pixel array utilizing a "4×" skip mode. Once again, the darkened pixels, representing color pixels R, Gr, B and Gb, form a pixel group which are the pixels which are readout. For each pixel group, one pixel group is readout while the next three groups of the same color of pixels in both the x and y directions are not readout. This leads to two columns of pixels for every eight columns of the pixel array 200 and two rows of pixels for every eight rows of the pixel array that are readout. In order to increase the dynamic range of an imager, multiple integration periods can be used. By combining the use of multiple integration periods with the skip mode operation increased dynamic range of the imager is provided. Additionally, by utilizing the skip mode operation with multiple integration periods decreased processing time is achieved.

Figure 2:
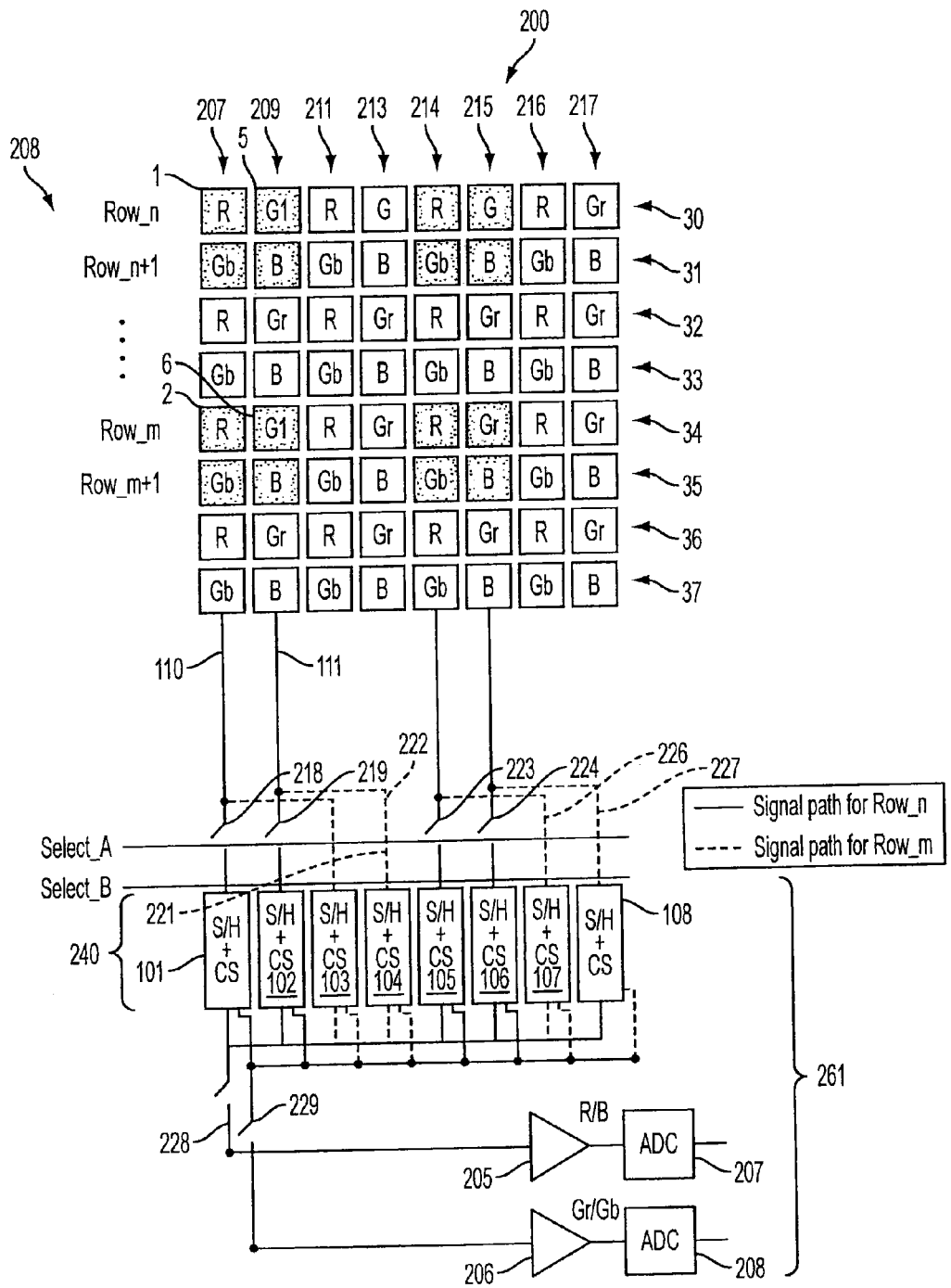
FIG. 2 is an example diagram of a skip mode circuit according to an embodiment described herein.

FIG. 2 illustrates, as an embodiment, a portion of an image sensor 208 pixel array 200 utilizing a "2×" skip mode and two integration times for reading out pixel cells. The pixel data from the second integration time can be readout sequential to the data of the first integration time by using the readout circuitry from the columns of pixels that are not being readout (i.e., that are skipped).

The pixel array 200 may be used to capture color images. In this case, the pixel array 200 may employ a color filter array (CFA) to separate red (R), green (Gr, Gb), and blue (B) information from a received color image. For example, each pixel may be covered with a red, a green, or a blue filter, according to a specific pattern, e.g., the "Bayer" CFA pattern. Additional color patterns which may alternatively be used include, for example, Cyan Magenta Yellow (CMY), Cyan Magenta Yellow Black (CMYK), or Red Green Blue Indigo (RGBI).

As a result of the color filtering, each pixel of the color image captured by the CMOS image sensor 208 having a CFA corresponds to only one color. Accordingly, hereinafter when a pixel is referred to by a color (e.g., red pixel), it should be understood that the pixel is associated with a filter that passes only that color of light (e.g., red). The color pattern illustrated for pixel array 200 of FIG. 2 is a Bayer color pattern. According to the illustrated Bayer pattern, even rows contain alternating green (designated as Gr) and red (designated as R) pixels. Odd rows contain alternating blue (designated as B) and green (designated as Gb) pixels.

FIG. 2 illustrates a portion of the columns and rows of pixel array 200 as columns 207, 209, 211, 213, 214, 215, 216, 217 and rows 30, 31, 32, 33, 34, 35, 36, 37. During a non-skip operation mode, each column of the pixel array 200 is connected to a respective sample and hold circuit S/H, the output of which is coupled to a respective column select switch in circuits 101, 102, 103, 104, 105, 106, 107, 108. The column select switches determines which signal, Vrst and Vsig output from the sample and hold circuits S/H, are processed by the column bus for each color of pixels. It should be understood that the sample and hold circuits are capable of storing Vrst and Vsig signals from the pixels of the pixel array 200. Each sample and hold circuit S/H, associated with a respective column switch, 101, 102, 103, 104, 105, 106, 107, 108, is respectively connected to switches 218, 219, 221, 222, 223, 224, 226, 227 which are activated, as necessary, during the "2×" skip mode operation. Switches 218, 219, 223, 224 are controlled by a Select_A signal and switches 221, 222, 226, 227 are controlled by a Select_B signal. The readout paths are formed when the switches 218, 219, 221, 222, 223, 224, 226, 227 receive a signal (i.e., Select_A or Select_B) and close. When the Select_A signal is high, the Select_B signal will be low and vice versa.

The outputs of the column select switches CS in circuits 101, 102, 103, 104, 105, 106, 107, 108 are connectable to two analog channels, having respective differential amplifiers 205, 206, via switches 228, 229, for reading out the pixel information. The first channel 206 reads out green Gr, Gb pixel signals and the second channel 205 reads out red and blue R, B pixel signals. Accordingly, the outputs of the sample and hold and column select switch circuit 101-108 are selectively provided by switches 228, 229 to one of the differential amplifiers 205, 206 depending on the color of the pixel signal being processed. After the pixel signal is processed by the respective analog channel amplifier 205, 206, the pixel signal is digitized by a respective analog-to-digital converter (ADC) 208, 207 before being processed by a digital imaging processing circuit (illustrated in FIG. 8). The invention is not limited to a two channel readout architecture but may use single channel, multiple channel, column parallel or group parallel readout channels.

In the embodiment illustrated in FIG. 2 two integration times T1, T2 are used. All of the pixels in a row are readout after the first integration time T1 and again after a second integration time T2. In this embodiment, T1>T2. Each pixel collects charge for both integrations periods independently. Additionally in this "2×" skip mode embodiment, two columns are readout, but the next two sequential columns are skipped (e.g., columns 207 and 209 will be readout and columns 211 and 213 will not be readout). This pattern is repeated for the entire pixel array 200. In a rolling shutter readout technique the integration time T can be expressed as a number of pixel array rows between the resetting of a pixel, which represents the start of integration of a particular pixel row, to the readout of the row. Thus, the number of rows for a first integration time T1 is expressed as the variable k1 and the number of integration rows for the second integration time T2 is expressed as k2.

As shown in FIG. 2, during a "2×" skip mode a first row row_n is selected for readout through the readout circuit illustrated with a solid line and a second row row_m is selected for readout through the circuit illustrated with a dotted line. The column readout circuits illustrated with the dotted line connections (e.g., 103, 104, 107, 108) correspond to the pixel columns that are skipped during readout. By utilizing these unused column readout circuits (e.g., 103, 104, 107, 108), rows row_n and row_m are able to be sequentially sampled and held in circuits 103, 104, 107, 108. Based on this illustrated embodiment, all analog signal paths are used and no column readout circuits remain un-used. It should be understood that FIG. 2 illustrates the connections of the column lines 207, 209, 211, 213, 214, 215, 216, 217 to the sample and hold S/H and the column select switch CS circuits 101, 102, 103, 104, 105, 106, 107, 108 when operating in a "2×" skip mode. When the pixel array 208 is operated in a high resolution mode each column 207, 209, 211, 213, 214, 215, 216, 217 is connected to a respective one of circuits 101, 102, 103, 104, 105, 106, 107, 108. This connection is not illustrated in FIG. 2 for simplicity.

Operation of the FIG. 2 circuit will now be described. Pixel 1 of a first row row_n, having a first integration time T1, is selected for readout. The pixel signals Vsig and Vrst of pixel 1 are readout on the column line 110. Switch 218, after being activated by the Select_A signal, connects the column line 110 to the sample hold S/H and column select switch CS circuit 101. The pixel signals are sampled and held and then the column select switch CS determines which column bus will process the signals in circuit 101. The resulting red signal is passed through switch 228 and processed by the R/B analog channel, having amplifier differential 205, and is subsequently digitized by analog-to-digital converter 207. After pixel 1 is readout, pixel 2 of row row_m, having a second integration time T2, is readout onto column line 110. Switch 221, after being activated by the Select_B signal, connects the column line to the sample hold S/H and column select switch CS circuit 103 when switch 221 is activated by Select B signal, Select A signal is deactivated disconnecting circuit 101 from column line 110. The pixel signals in column line 110 are sampled and held and selected within circuit 103. The resulting signal is passed through switch 228 and processed by the R/B analog channel, having differential amplifier 205, and subsequently digitized by analog-to-digital converter 207. The signals of the second row row_m (e.g., pixel 2) are readout through a column readout circuit that otherwise would have gone unused. The pixel signals in other rows and columns of the array are similarly processed in a rolling shutter operation with switches 228 and 229 determining which color channel (R/B or Gr/Gb) the outputs of circuits 101-108 are connected to in accordance with the color of the pixel being readout.

Pixel 5 of row row_n is readout simultaneously with pixel 1 of row row_n. The pixel signals Vsig and Vrst of pixel 5 are readout on the column line 111. Switch 219, after being activated by the Select_A signal, connects the column line 111 to sample hold S/H and column select switch CS circuit 102. The pixel signals are sampled and held and selected in circuit 102. The resulting green signal (Gr) is passed through switch 229 and processed by the Gr/Gb analog channel, having differential amplifier 206, and is subsequently digitized by analog-to-digital converter 208. Pixel 6 of row row_m is readout simultaneously with pixel 2 of row row_m. Switch 222, after being activated by the Select_B signal, connects the column line 111 to sample and hold S/H and column select switch CS circuit 104. The pixel signals are sampled and held and selected in circuit 104. The resulting green signal is passed through switch 228 and processed by the Gr/Gb analog channel, having differential amplifier 206, and subsequently digitized by analog-to-digital converter 208.

Figure 3:
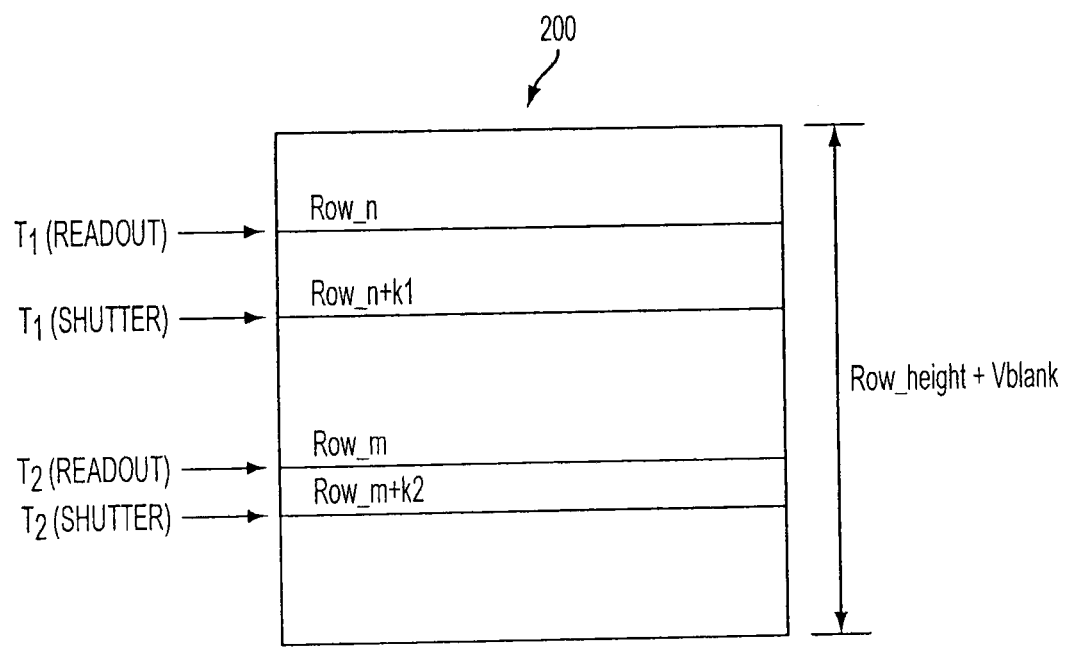
FIG. 3 illustrates example readout pointer locations.

FIG. 3 illustrates example locations of the row pointers used to start integration and readout the rows of pixel array 200. The pointers illustrated in FIG. 3 are for the embodiment described with respect to FIG. 2 in which a "2×" skip mode and two integration periods are used. The readout pointer T1(readout) of the first integration time is at row row_n and the readout pointer T2(readout) of the second integration time is at row row_m. As a result, the shutter pointer T1(shutter) of the first integration time, which starts the integration period T1, is at row row_n+k1. The shutter pointer T2(shutter) which starts the second integration time is at row row_m+k2. The shutter pointers illustrate the rows where in the pixel are being reset and to start an integration period. If an overlap of the shutter pointer and the next readout pointer is undesirable, the follow equations are applicable:

$$m+k2 \leq n \quad (1) \text{ and}$$

$$n+k1-(Row\_height+Vblank) \leq m, \quad (2)$$

where Row_Height is equal to the number of rows having pixel information, and VBlank is the number of rows having no pixel information. Such pixel rows may be provided at the top and/or bottom of a pixel array. In a specific image sensor implementation, to avoid the row address switching too frequently during readout, the timing can be simplified as follows:

$$m+k2=n \quad (3) \text{ and}$$

$$n+k1-(Row\_height+Vblank)=m. \quad (4)$$

$$\text{Thus, } k2=n-m \quad (5) \text{ and}$$

$$k1=m-n+(Row\_height+Vblank)=(Row\_height+Vblank)-k2. \quad (6)$$

The two integration times T1, T2 can be expressed as follows, where T1 is the longer of the two integration times:

$$T1 = k1 T_{row} = (\text{Row\_Height} + V\text{Blank} - k2) T_{row} \quad (7) \text{ and}$$

$$T2 = k2 T_{row}, \quad (8)$$

where $T_{row}$ is the readout time for one row. A dynamic range boost factor α, which is the ratio of T1 and T2 can be calculated as follows:

$$\frac{T1}{T2} = \frac{k1}{k2} = \alpha. \quad (9)$$

The boost factor is used in calculating the dynamic range of the circuit. The dynamic range of the pixel circuit is calculated as follows:

$$DR = DR_{T1} + 20\log\left(\frac{T1}{T2}\right) = DR_{T1} + 20\log(\alpha). \quad (10)$$

For example, the dynamic range of an example pixel circuit can be calculated as follows, where k1 is equal to 200 rows and k2 is equal to 1 row, then DR=64 dB+46 dB=110 dB, where the typical dynamic range of an imager is 64 dB. The double integration time for each pixel increases the dynamic range of the pixel circuit by 20 log(200) or 46 dB. The values of k1 and k2 can be set as constants or they can be decided by an algorithm that is automatically adjusted according to the current scene's luminance information.

Figure 4:
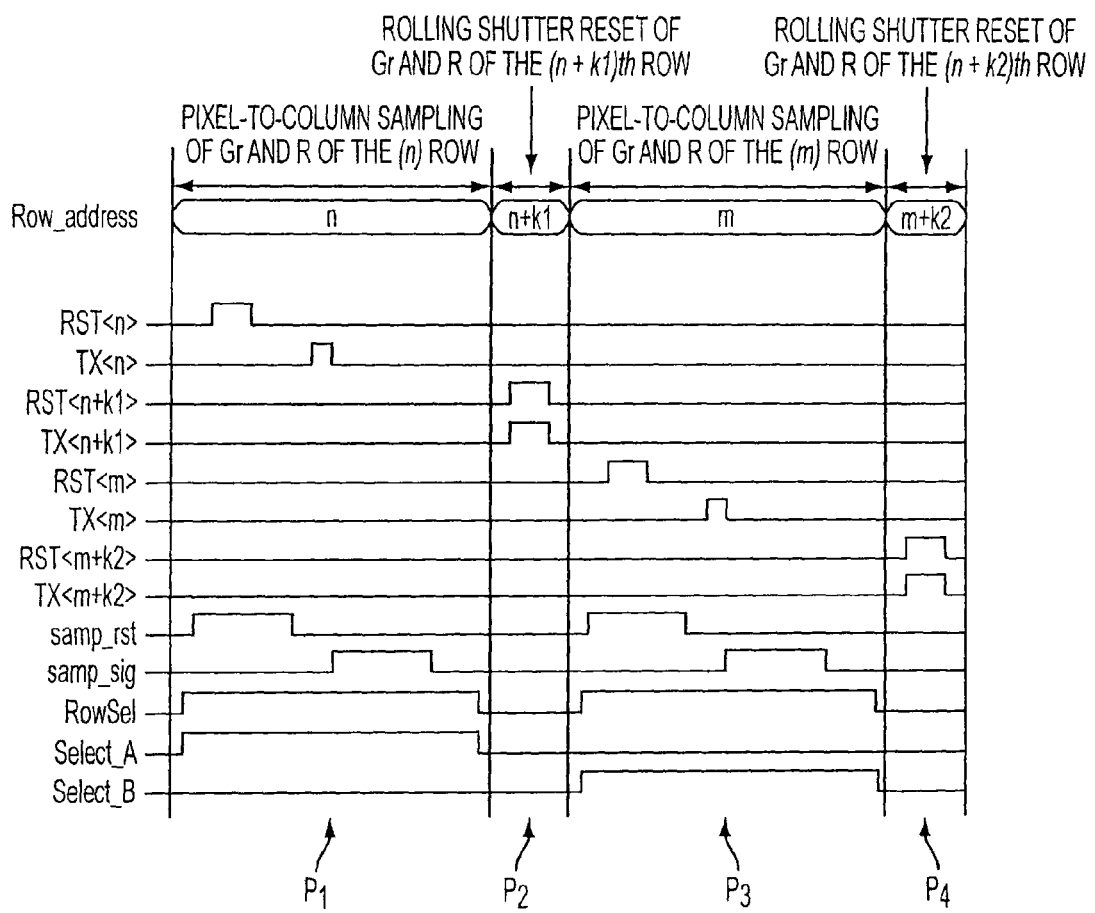
FIG. 4 is an example readout timing diagram of a pixel array according to an embodiment described herein.

FIG. 4 illustrates an example timing diagram for operation of the FIG. 2 embodiment. Although FIG. 4 only illustrates the timing for the readout of green Gr and red R pixels signals, green Gb and blue B pixels signals will be readout similarly. FIG. 4 illustrates a first period P1 for pixel-to-column readout of Gr and R signals of row row_n, a second period P2 for resetting Gr and R pixels of row row_n+k1 and starting an integration period for that row, a third period P3 for pixel-to-column readout of Gr and R signals of row_m and a fourth period for resetting Gr and R pixels of row row_m+k2 and starting an integration period for that row. K1 and k2 each represent a number of rows and are used to define the integration periods T1 and T2. Referring to FIGS. 2 and 4, first row row_n is selected for pixel-to-column readout by sampling the currently stored charge on storage region 70 by pulsing and maintaining the Select_A signal. The Select_A and Select_B signals are used to connect the row being readout to the appropriate readout circuitry (shown in FIG. 2). In the first period P1, the storage region 70 of the pixels in row row_n are reset by pulsing the RST<n> signal. The reset charge on the storage region 70 of the red pixel is sampled onto a capacitor in a sample and hold circuit in circuit 101, by pulsing the samp_rst signal. This sampling causes a reset signal Vrst to be placed on a sampling capacitor of a sample and hold circuit. In addition, the Vrst signal for the given Gr pixel is stored on a sampling capacitor of a sample and hold circuit in circuit 102 and reset signals for each of the R and Gr pixels in row row_n are likewise on respective sampling capacitors of sample and hold circuits. This readout process is the same for the selected red R and Gr pixels in row row_n. Subsequently, the transfer signal TX<n> is pulsed to transfer charge from the photosensors 20 to the storage regions 70 of all pixels of row row_n. A sampling of the transferred charge for each pixel is initiated by the samp_sig pulse. This sampling causes a photogenerated signal Vsig for the red pixel R of column 207 to be placed in a sampling capacitor in sample and hold circuit in circuit 101 and a signal Vsig for the Gr pixel of column 209 to be stored on a sample and hold capacitor in sample and hold circuit 102. In a similar manner, Vsig signals for each of the red R and green Gr pixels in row row_n are stored in capacitors in respective column sample and hold circuits. The sampled signals are then selected, subtracted by respective differential amplifiers 205, 206 and the readout is digitized by analog-to-digital converters 207, 208 (FIG. 8) as described further below.

In the second period P2, the storage region 70 and photosensor 20 of pixels in row row_n+k1 are reset during a rolling shutter operation by pulsing RST<n+k1> and TX<n+k1> signals. While RST<n+k1> is high, photosensors 20 of pixels 10 connected to TX<n+k1> are reset by pulsing TX<n+k1> which operates transfer transistor 41 (FIG. 1) and couples photosensor 20 to the reset voltage. When the RX<n+k1> signal goes low this starts the integration period for the photosensors in row row_n+k1.

In period three P3, row row_m, which had been integrating charge, is selected for pixel-to-column readout. Select_B signal is pulsed and maintained The storage region 70 of the pixels in row row_m are reset by pulsing the RST<m> signal. The reset charge on the storage region 70 is sampled next by pulsing the samp_rst signal. This sampling causes a reset signal Vrst of the given red pixel to be placed on a sampling capacitor of a sample and hold circuit 103. In addition, the Vrst signal for the given Gr pixel is stored on a sampling capacitor of a sample and hold circuit in circuit 104 and reset signals for each of the R and Gr pixels in row row_n are likewise on respective sampling capacitors of sample and hold circuits. This readout process is the same for red R and Gr pixels in row row_n. Subsequently, the TX<m> signal is pulsed to transfer charge from the photosensors 20 of the row pixels to the storage regions 70 of all pixels of row row_m. A sampling of the transferred charge for each pixel is executed by a samp_sig pulse. This sampling causes a photogenerated signal Vsig for the red pixel R of column 207 to be placed in a sampling capacitor in sample and hold circuit 103 and a signal Vsig for the Gr pixel of column 209 to be stored on a sample and hold capacitor in sample and hold circuit of circuit 104. In a similar manner, Vsig signals for each of the red R and green Gr pixels in row row_m are stored in capacitors in respective column sample and hold circuits. The sampled signals are then selected, subtracted by respective differential amplifiers 205, 206 and the readout is digitized by analog-to-digital converters 207, 208 (FIG. 8).

Similarly in period four P4, pulses on RST<m+k2> and TX<m+k2> initiate a rolling shutter reset and start of integration in row row_m+k2. While RST<m+k2> is high, photosensors 20 of pixels 10 connected to TX<m+k2> are reset by pulsing TX<m+k2> which operates transfer transistor 41 (FIG. 1) and couples photosensor 20 to the reset voltage.

After the readout of the pixel values by the circuit illustrated in FIG. 2, an image is generated. The generated image is the result of the pixel information from both the first and second integration times. Image processing is used to generate a resulting image utilizing data from the two integration periods T1 and T2. The image processing can occur using on-chip hardware (e.g., a line buffer can be used to save and separate the pixel information based on the amount of light collected for each pixel) or off-chip image processing software may be used.

Figure 5A:
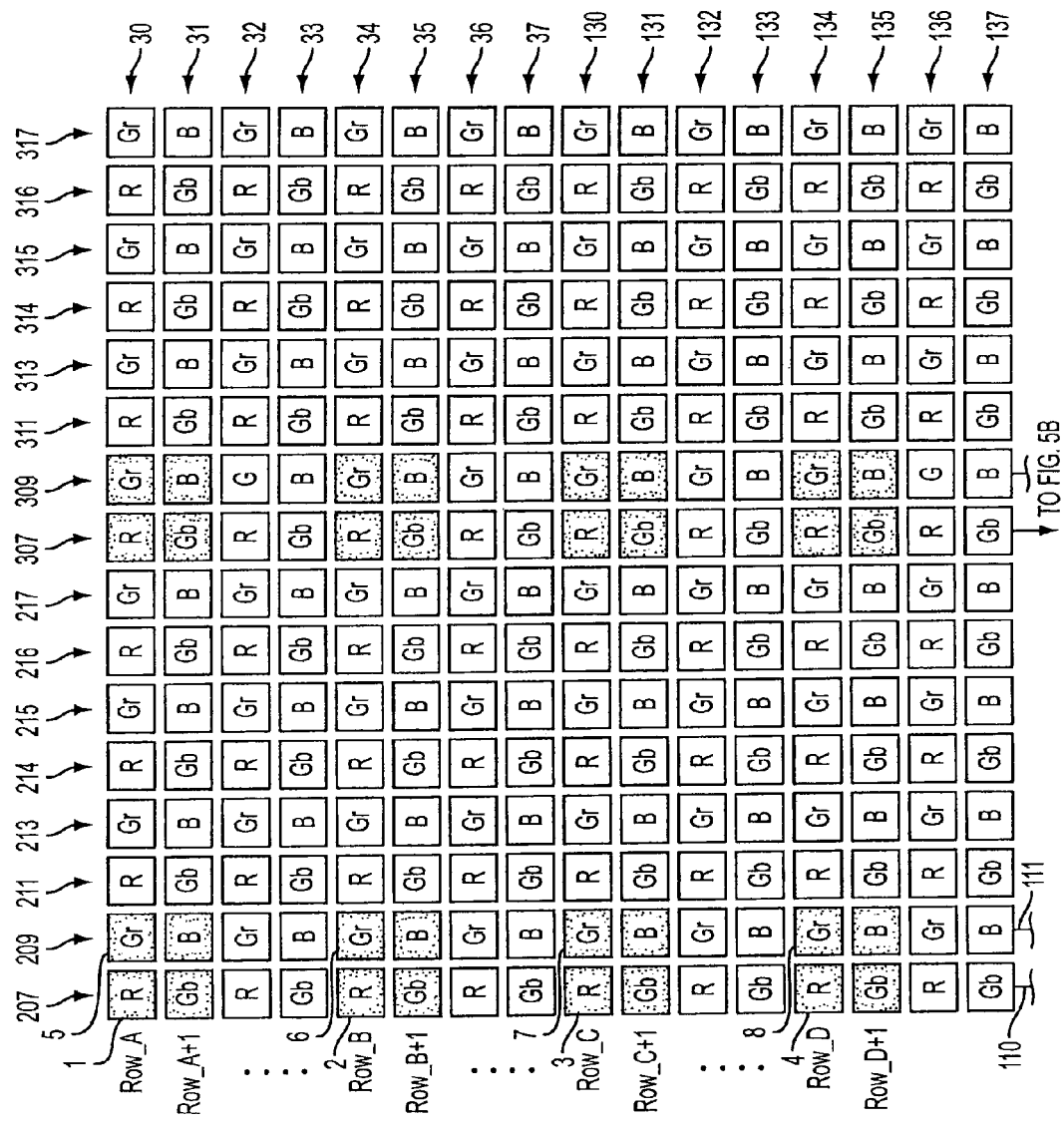
FIG. 5 A-B is an example diagram of a skip mode circuit according to an embodiment described herein.
Figure 5B:
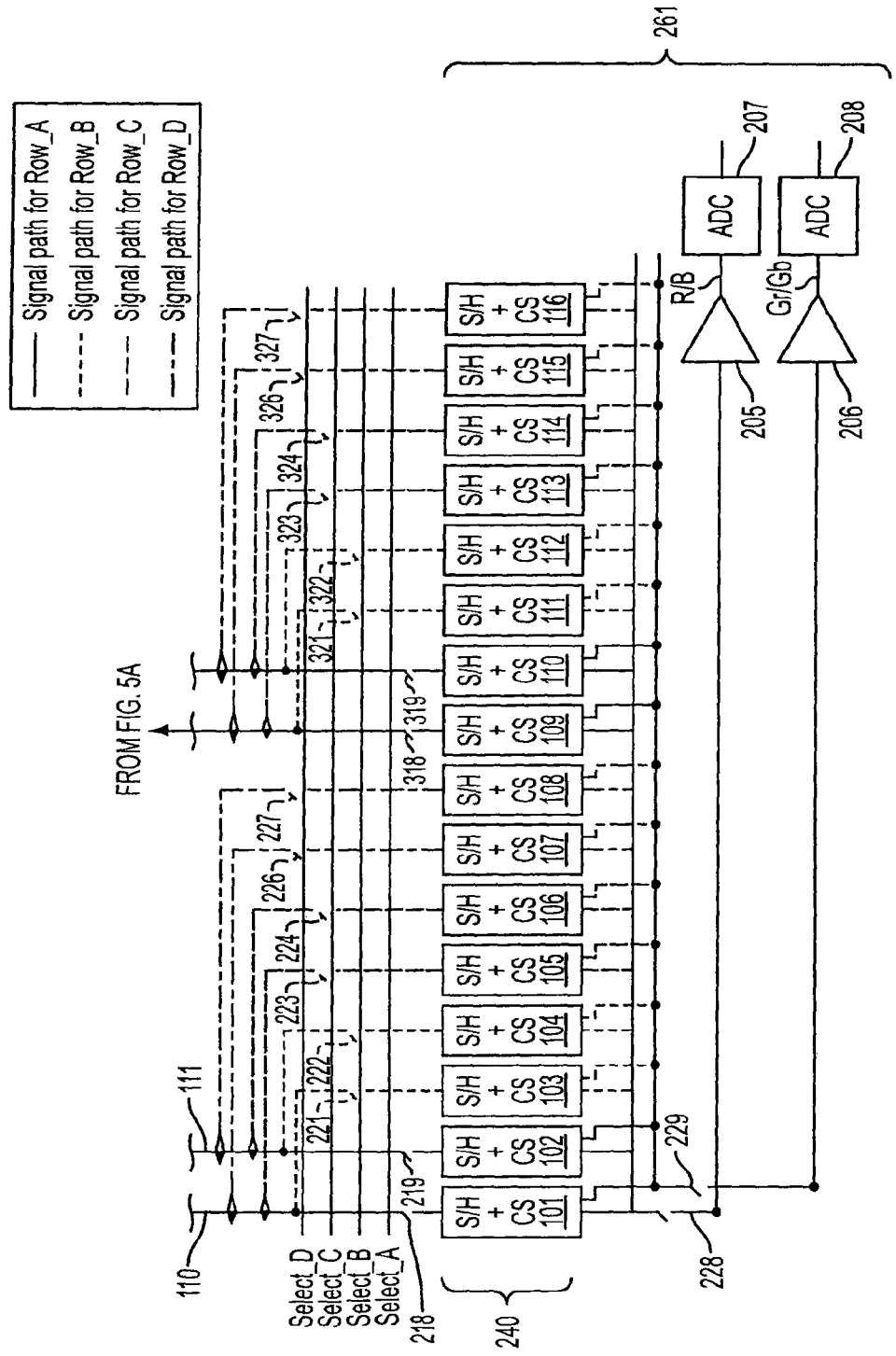

FIG. 5 A-B illustrates an example embodiment having four integration times and utilizes a "4×" skip mode. As shown in FIG. 5 A-B, a first row row_A is readout through the readout circuitry illustrated with a solid line and rows row_B, row_C, and row_D selected for readout are readout through the circuitry illustrated with dotted lines. The column readout circuitry illustrated with the dotted lines (e.g., 103, 104, 105, 106, 107, 108) corresponds to the columns that are skipped during a "4×" skip mode readout. By utilizing this unused circuitry (e.g., 103, 104, 105, 106, 107, 108), integrated pixel signals Vrst, Vsig in rows row_A, row_B, row_C and row_D are able to be sequentially sampled and selected by the column select switch. Based on this illustrated embodiment, all signal paths are being used and no column readout circuits remain un-used. It should be understood that FIG. 5 A-B illustrates the connections of the column lines 207, 209, 211, 213, 214, 215, 216, 217, 307, 309, 311, 313, 314, 315, 316, 317 to the sample and hold S/H and column select switch CS circuits 101, 102, 103, 104, 105, 106, 107, 108, 109, 110, 111, 112, 113, 114, 115, 116 when operating in "4×" skip mode. When the pixel array 208 is operated in a high resolution mode each column 207, 209, 211, 213, 214, 215, 216, 217, 307, 309, 311, 313, 314, 315, 316, 317 is connected to a respective one of circuits 101, 102, 103, 104, 105, 106, 107, 108, 109, 110, 111, 112, 113, 114, 115, 116. This connection is not illustrated in FIG. 5A-B for simplicity.

Referring to FIG. 5A-B, pixel 1 of a first row row_A, which as been integrated and has a first integration time T1, is first selected for readout. The pixel signals Vsig and Vrst of the pixel 1 are readout on the column line 110. Switch 218, after being activated by the Select_A signal, connects the column line 110 to sample hold S/H and differential amplifier circuit 101. The pixel signals are sampled and held and then selected by the column select switch in circuit 101. The resulting red signal is passed through switch 228 and processed by the R/B analog channel, having differential amplifier 205, and is subsequently digitized by analog-to-digital converter 207. After pixel 1 is readout, pixel 2 of row row_B is sequentially readout. Switch 221, after being activated by the Select_B signal, connects the column line to sample hold S/H and column select switch CS circuit 103 when switch 221 is activated by Select_B signal, Select_A signal is deactivated disconnecting circuit 101 from column line 110. The pixel signals are sampled and held and then selected by the column select switch in circuit 103. The resulting red signal is passed through switch 228 and processed by the R/B analog channel, having differential amplifier 205, and subsequently digitized by analog-to-digital converter 207. Next pixel 3 of row row_C is readout. Switch 223, after being activated by the Select_C signal, connects the column line 111 to sample hold S/H and column select switch CS circuit 105 when switch 223 is activated by Select_C signal, Select_B signal is deactivated disconnecting circuit 103 from column line 110. The pixel signals are sampled and held and then selected by the column select switch in circuit 105. The resulting red signal is passed through switch 228 and processed by the R/B analog channel, having differential amplifier 205, and is then subsequently digitized by analog-to-digital converter 207. Next pixel 4 of row row_D is readout. Switch 226, after being activated by the Select_D signal, connects the column line 110 to sample hold S/H and column select switch CS circuit 107 when switch 226 is activated by Select_D signal, Select_C signal is deactivated disconnecting circuit 105 from column line 110. The pixel signals are sampled and held and then selected by the column select switch in circuit 107. The resulting red signal is passed through switch 228 and processed by the R/B analog channel, having differential amplifier 205, and are subsequently digitized by analog-to-digital converter 207. The signals of rows row_B (e.g., pixel 2), row_C (e.g., pixel 3) and row_D (e.g., pixel 4) are readout through column readout circuits that otherwise would be unused in a "4×" skip mode operation.

The pixel signals Vsig and Vrst of pixel 5 are readout on column line 111 at the same time pixel 1 is readout. Switch 219, after being activated by the Select_A signal, connects column line 111 to sample hold S/H and column select switch CS circuit 102. The pixel signal is sampled and held and then selected by the column select switch CS in circuit 102. The resulting green signal is passed through switch 229 and processed by the Gr/Gb analog channel, having differential amplifier 206, and is subsequently digitized by analog-to-digital converter 208. Pixel 6 of row row_B is sequentially readout at the same time as pixel 2. Switch 222, after being activated by the Select_B signal, connects the column line 111 to sample hold S/H and column select switch CS circuit 104 when switch 222 is activated by Select_B signal, Select_A signal is deactivated disconnecting circuit 102 from column line 111. The pixel signals are sampled and held and then selected by column select switch CS in circuit 104. The resulting green signal is passed through switch 229 and processed by the Gr/Gb analog channel, having differential amplifier 206, and subsequently digitized by analog-to-digital converter 208. Pixel 7 of row row_C is readout at the same time as pixel 3. Switch 224, after being activated by the Select_C signal, connects the column line to sample hold S/H and column select switch CS circuit 106 when switch 224 is activated by Select_C signal, Select_B signal is deactivated disconnecting circuit 104 from column line 111. The pixel signals are sampled and held and then selected by column select switch in circuit 106. The resulting green signal is passed through switch 229 and processed by the Gr/Gb analog channel, having differential amplifier 206, and is then subsequently digitized by analog-to-digital converter 208. Pixel 8 of row row_D is readout at the same time as pixel 4. Switch 227, after being activated by the Select_D signal, connects the column line to sample hold S/H and column select switch CS circuit 108 when switch 227 is activated by Select_D signal, Select_C signal is deactivated disconnecting circuit 106 from column line 111. The pixel signals are sampled and held and selected by column select switch in circuit 108. The resulting green signal is passed through switch 228 and processed by the Gr/Gb analog channel 206 and subsequently digitized by analog-to-digital converter 208. The signals of rows row_B (e.g., pixel 6), row_C (e.g., pixel 7) and row_D (e.g., pixel 8) are readout through column readout circuits 104, 106, 108 that otherwise would have gone unused during the "4×" skip mode operation. The pixels in columns 307 and 309 are readout in a substantially similar manner as columns 207, 209 but through another set of sample and hold and differential amplifier circuits.

Figure 12:
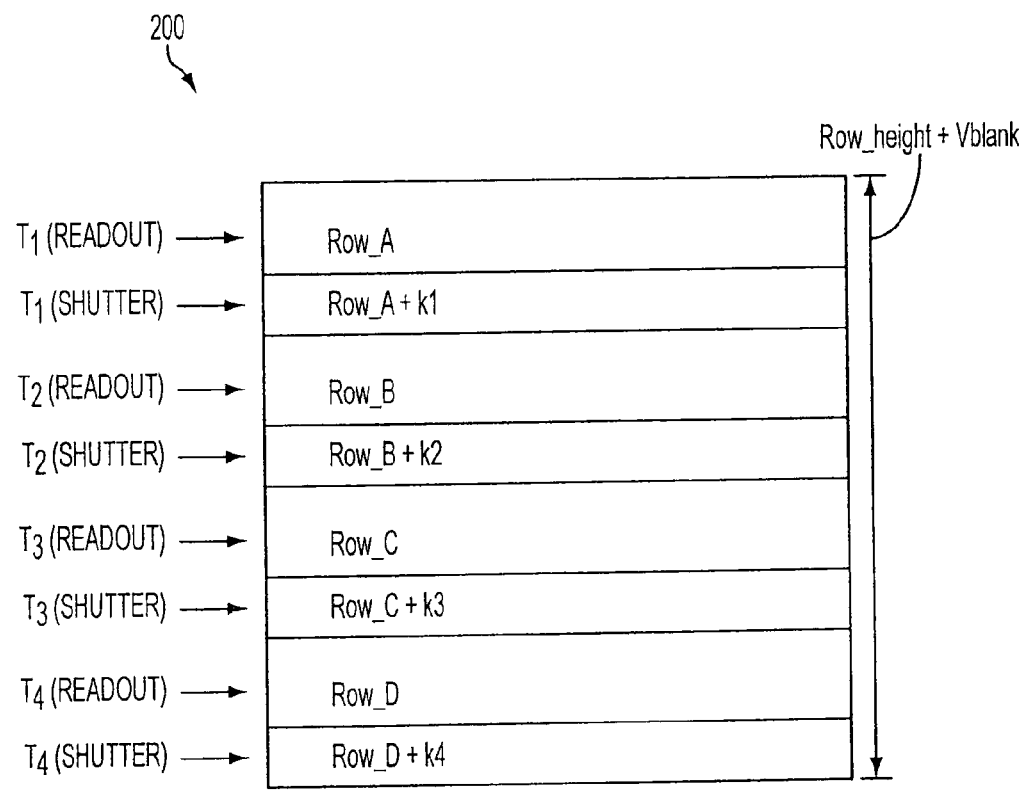
FIG. 12 illustrates example readout pointer locations.

FIG. 12 illustrates example locations of the row pointers used to start integration and readout the rows of pixel array 200. The pointers illustrated in FIG. 12 are for the embodiment described with respect to FIG. 5A-B in which a "4×" skip mode and four integration periods are used. The readout pointer T1(readout) of the first integration time is at row row_A, the readout pointer T2(readout) of the second integration time is at row row_B, the readout pointer T3(readout) of the third integration time is at row row_C and the readout pointer T4(readout) of the fourth integration time is at row row_D. As a result, the shutter pointer T1(shutter) of the first integration time, which starts the integration period T1, is at row row_A+k1. The shutter pointer T2(shutter) which starts the second integration time is at row row_B+k2. The shutter pointer T3(shutter) which starts the third integration time is at row row_C+k3. The shutter pointer T4(shutter) which starts the fourth integration time is at row row_D+k4. The shutter pointers illustrate the rows where in the pixel are being reset and to start an integration period.

Figure 6A:
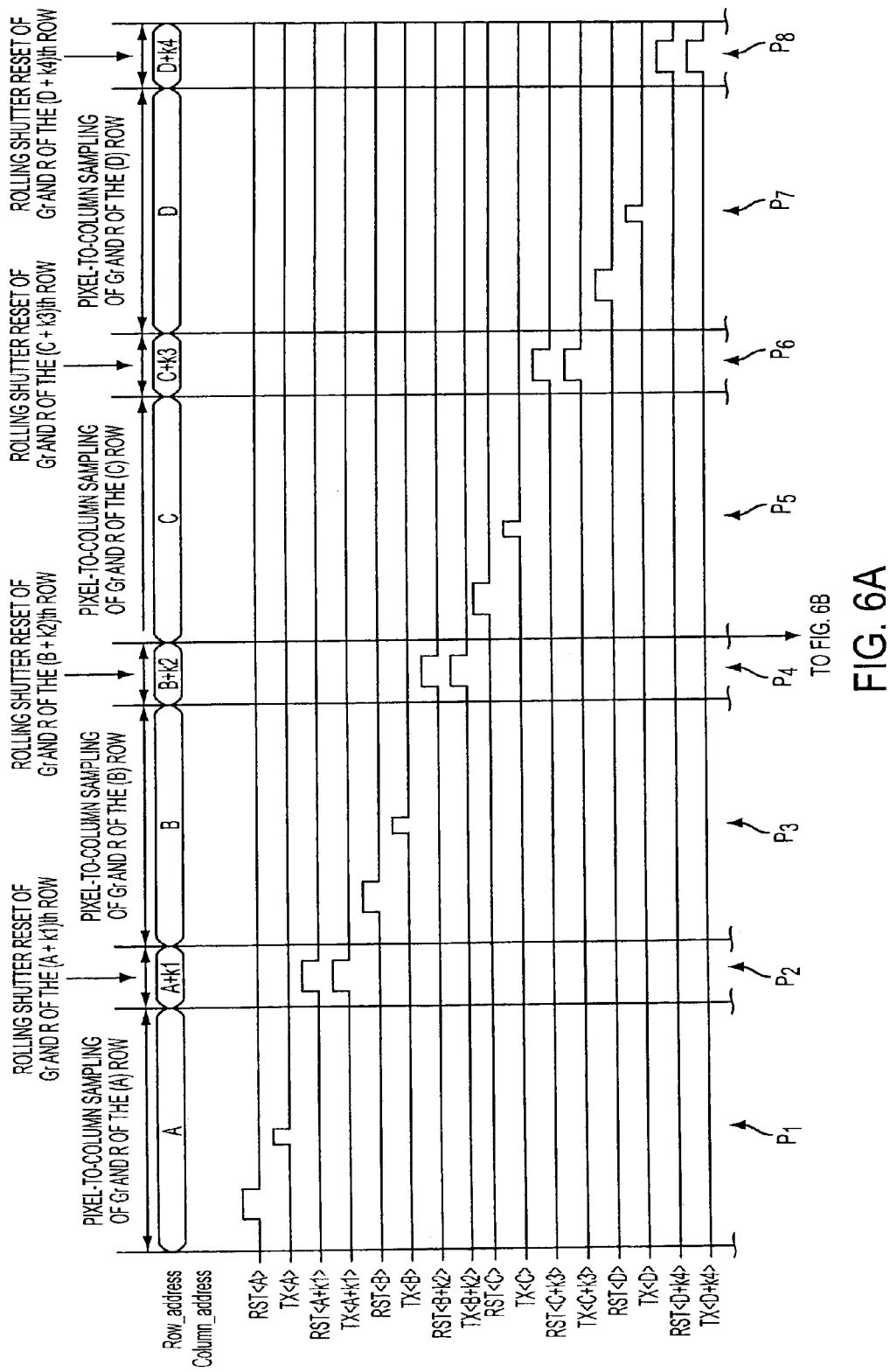
FIG. 6 A-B is an example readout timing diagram of a pixel array according to an embodiment described herein.
Figure 6B:
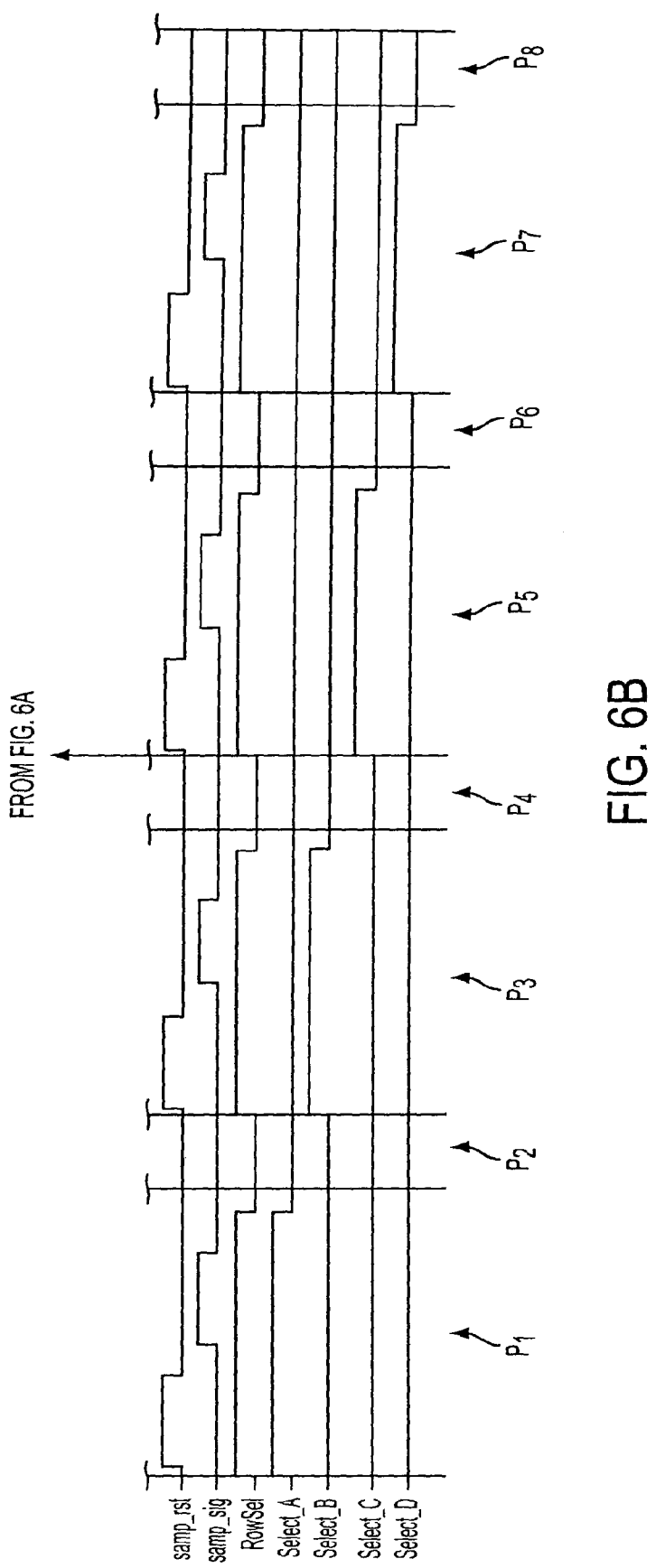

FIG. 6A-B illustrates an example timing diagram of the embodiment illustrated and described with respect to FIG.

5A-B. Although FIG. 6A-B only illustrates the timing for the readout of green Gr and red R pixels signals, green Gb and blue B pixels signals will be readout similarly. FIG. 6A-B illustrates a first period. P1 for pixel-to-column readout of Gr and R signals of row row_A, a second period P2 for resetting Gr and R pixels of row row_A+k1 and starting an integration period for that row, a third period P3 for pixel-to-column readout of Gr and R signals of row row_B, a fourth period P4 for resetting Gr and R pixels of row row_B+k2 and starting an integration period for that row, a fifth period P5 for pixel-to-column readout of Gr and R signals of row row_C, a sixth period P6 for resetting Gr and R pixels of row row_C+k3 and starting an integration period for that row, a seventh period P7 for pixel-to-column readout of Gr and R signals of row row_C, a eighth period P8 for resetting Gr and R pixels of row row_D+k4 and starting an integration period for that row. K1, k2, k3 and k4 each represent a number of rows and are used to define the integration periods T1, T2, T3 and T4.

Referring to FIGS. 5A-B and 6A-B, first row_A is selected for pixel-to-column readout by sampling the currently stored charge on storage region 70 by pulsing and maintaining the Select_A signal. The Select_A, Select_B, Select_C, and Select_D signals are used to connect the row being readout to the appropriate readout circuitry (shown in FIG. 5B). The storage region 70 of the pixels in row row_A are reset by pulsing the RST<a> signal. The reset charge on the storage region 70 of the red pixel is sampled onto a capacitor in a sample and hold circuit in circuit 101, by pulsing the samp_rst signal. This sampling causes a reset signal Vrst to be placed on a sampling capacitor of a sample and hold circuit. In addition, the Vrst signal for the given Gr pixel is stored on a sampling capacitor of a sample and hold circuit in circuit 102 and reset signals for each of the R and Gr pixels in row row_A are likewise on respective sampling capacitors of sample and hold circuits in circuits 101, 102. This readout process is the same for other red R and Gr pixels in row row_A. Subsequently, the transfer signal TX<A> is pulsed to transfer charge from the photosensors 20 to the storage regions 70 of all pixels of row_A. A sampling of the transferred charge for each pixel is initiated by the samp_sig pulse. This sampling causes a photogenerated signal Vsig for the red pixel R of column 207 to be placed in a sampling capacitor in sample and hold circuit in circuit 101 and a signal Vsig for the Gr pixel of column 209 to be stored on a sample and hold capacitor in sample and hold circuit 102. In a similar manner, Vsig signals for each of the other red R and green Gr pixels in row_A are stored in capacitors in respective column sample and hold circuits. The sampled signals are selected by the respective column select switches, subtracted by respective differential amplifiers 205, 206 and the readout is digitized by analog-to-digital converters 207, 208 (FIG. 8).

In the second period P2, the storage region 70 and photosensor 20 of pixels in row_A+k1 are reset during a rolling shutter operation by pulsing RST<A+k1> and TX<A+k1> signals. While RST<A+k1> is high, photosensors 20 of pixels 10 connected to TX<A+k1> are reset by pulsing TX<A+k1> which operates transfer transistor 41 (FIG. 1) and couples photosensor 20 to the reset voltage. When the RX<A+k1> signal goes low this starts the integration period for the photosensors in row row_A+k1.

In period three P3, row row_B, which had been integrating charge, is selected for pixel-to-column readout. Select_B signal is pulsed and maintained. The storage region 70 of the pixels in row row_B are reset by pulsing the RST<B> signal. The reset charge on the storage region 70 is sampled next by pulsing the samp_rst signal. This sampling causes a reset signal Vrst to be placed on a sampling capacitor of a sample and hold circuit 103. In addition, the Vrst signal for the given Gr pixel is stored on a sampling capacitor of a sample and hold circuit in circuit 104 and reset signals for each of the R and Gr pixels in row row_B are likewise on respective sampling capacitors of sample and hold circuits in circuits 103, 104. This readout process is the same for red R and Gr pixels in row row_B. Subsequently, the TX<B> signal is pulsed to transfer charge from the photosensors 20 of the row pixels to the storage regions 70 of all pixels of row row_B. A sampling of the transferred charge for each pixel is executed by a samp_sig pulse. This sampling causes a photogenerated signal Vsig for the red pixel R of column 207 to be placed in a sampling capacitor in sample and hold circuit 103 and a signal Vsig for the Gr pixel of column 209 to be stored on a sample and hold capacitor in sample and hold circuit of circuit 104. In a similar manner, Vsig signals for each of the red R and green Gr pixels in row row_B are stored in capacitors in respective column sample and hold circuits. The sampled signals are selected by the respective column select switches, subtracted by respective differential amplifiers 205, 206 and the readout is digitized by analog-to-digital converters 207, 208 (FIG. 8).

Similarly in period four P4, pulses on RST<B+k2> and TX<B+k2> initiate a rolling shutter reset and start of integration in row row_B+k2. While RST<B+k2> is high, photosensors 20 of pixels 10 connected to TX<B+k2> are reset by pulsing TX<B+k2> which operates transfer transistor 41 (FIG. 1) and couples photosensor 20 to the reset voltage.

In period five P5, row row_C, which had been integrating charge, is selected for pixel-to-column readout. Select_C signal is pulsed and maintained. The storage region 70 of the pixels in row row_C are reset by pulsing the RST<C> signal. The reset charge on the storage region 70 is sampled next by pulsing the samp_rst signal. This sampling causes a reset signal Vrst to be placed on a sampling capacitor of a sample and hold circuit 105. In addition, the Vrst signal for the given Gr pixel is stored on a sampling capacitor of a sample and hold circuit in circuit 104 and reset signals for each of the R and Gr pixels in row row_C are likewise on respective sampling capacitors of sample and hold circuits in circuits 105, 106. This readout process is the same for other red R and Gr pixels in row row_C. Subsequently, the TX<C> signal is pulsed to transfer charge from the photosensors 20 of the row pixels to the storage regions 70 of all pixels of row_C. A sampling of the transferred charge for each pixel is executed by a samp_sig pulse. This sampling causes a photogenerated signal Vsig for the red pixel R of column 207 to be placed in a sampling capacitor in sample and hold circuit 105 and a signal Vsig for the Gr pixel of column 209 to be stored on a sample and hold capacitor in sample and hold circuit of circuit 105. In a similar manner, Vsig signals for each of the other red R and green Gr pixels in row row_C are stored in capacitors in respective column sample and hold circuits. The sampled signals are selected by the respective column select switches, subtracted by respective differential amplifiers 205, 206 and the readout is digitized by analog-to-digital converters 207, 208 (FIG. 8).

Similarly in period six P6, pulses on RST<C+k3> and TX<C+k3> initiate a rolling shutter reset and start of integration in row row_C+k3. While RST<C+k3> is high, photosensors 20 of pixels 10 connected to TX<C+k3> are reset by pulsing TX<C+k3> which operates transfer transistor 41 (FIG. 1) and couples photosensor 20 to the reset voltage.

In period seven P7, row row_D, which had been integrating charge, is selected for pixel-to-column readout. Select_D signal is pulsed and maintained The storage region 70 of the pixels in row row_D are reset by pulsing the RST<D> signal. The reset charge on the storage region 70 is sampled next by pulsing the samp_rst signal. This sampling causes a reset signal Vrst to be placed on a sampling capacitor of a sample and hold circuit 107. In addition, the Vrst signal for the given Gr pixel is stored on a sampling capacitor of a sample and hold circuit in circuit 108 and reset signals for each of the R and Gr pixels in row_D are likewise on respective sampling capacitors of sample and hold circuits in circuits 107, 108. This readout process is the same for other red R and Gr pixels in row_n. Subsequently, the TX<D> signal is pulsed to transfer charge from the photosensors 20 of the row pixels to the storage regions 70 of all pixels of row row_D. A sampling of the transferred charge for each pixel is executed by a samp_sig pulse. This sampling causes a photogenerated signal Vsig for the red pixel R of column 207 to be placed in a sampling capacitor in sample and hold circuit 107 and a signal Vsig for the Gr pixel of column 209 to be stored on a sample and hold capacitor in sample and hold circuit of circuit 108. In a similar manner, Vsig signals for each of the other red R and green Gr pixels in row row_D are stored in capacitors in respective column sample and hold circuits. The sampled signals are selected by the respective column select switches, subtracted by respective differential amplifiers 205, 206 and the readout is digitized by analog-to-digital converters 207, 208 (FIG. 8).

Similarly in period eight P8, pulses on RST<D+k4> and TX<D+k4> initiate a rolling shutter reset and start of integration in row row_D+k4. While RST<D+k4> is high, photosensors 20 of pixels 10 connected to TX<D+k4> are reset by pulsing TX<D+k4> which operates transfer transistor 41 (FIG. 1) and couples photosensor 20 to the reset voltage.

Figure 7:
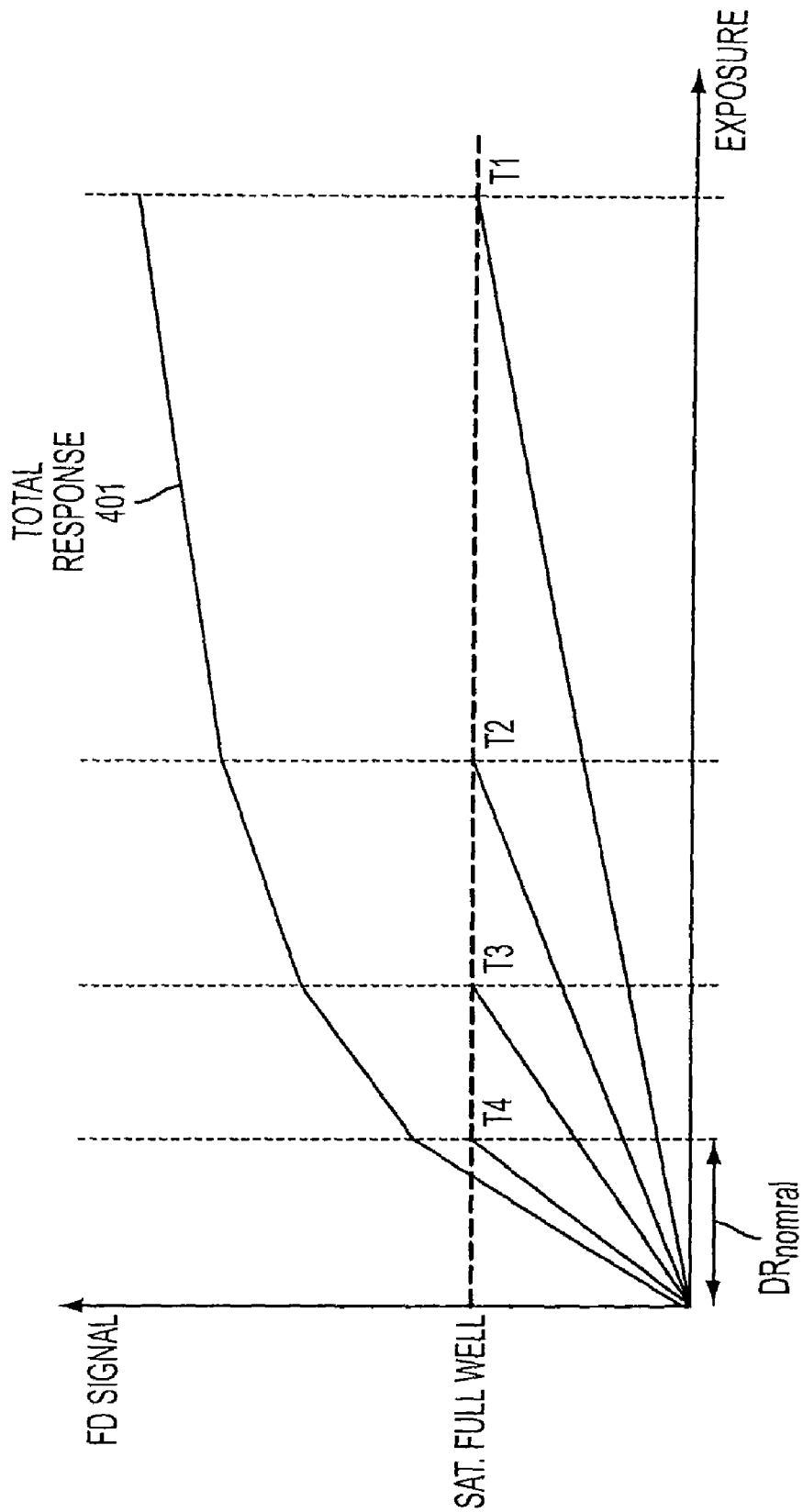
FIG. 7 is a graph illustrating pixel output in comparison to the exposure of incident light for pixels signals for four integration times.

FIG. 7 illustrates an example of a dynamic range response curve of an image sensor operating in "4×" skip mode having four integration times. FIG. 7 illustrates four different integration times T1, T2, T3 and T4, with integration time T1 having the longest duration and integration time T4 having the shortest duration. The resulting total response 401 illustrates the increased effective dynamic range when implementing an image sensor 208 utilizing the four different integration times. The "Sat. Full Well" line indicates the point at which the photosensors cannot collect any additional charge. The "FD signal" axis is the amount of signal that is received from the floating diffusion region when the charged collected by the photosensor is readout.

FIG. 8 illustrates a block diagram of image sensor 208 which employs embodiments described above. The image sensor 208 has a pixel array 200 comprising a plurality of pixels arranged in a predetermined number of columns and rows. Attached to the array 200 is signal processing circuitry. The pixels of each row in the array 200 are all turned on at the same time by a row select signal, and the selected pixels of each activated row are selectively output by column select lines as described above. A plurality of row and column select lines are provided for the entire array 200. The row lines are selectively activated by a row driver 210 in response to row address decoder 220. The column select lines are selectively activated by a column driver 260 in response to column address decoder 270. Thus, a row and column address is provided for each pixel.

The image sensor 208 is operated by the timing and control circuit 250, which controls address decoders 270, 220 for selecting the appropriate row and column lines for pixel readout in the manner described for the various embodiments. The control circuit 250 also controls the row and column driver circuitry 210, 260 such that they apply driving voltages to the drive transistors of the selected row and column select lines as described above. The Vrst, Vsig pixel column signals are sampled and held by sample and hold circuits in circuit 240.

Circuit 240 includes all sample and hold and column select switches for each column of the pixel array as illustrated in FIGS. 2 and 5. After the signals are sampled and held they are selected by the corresponding column select switch in circuit 240. The image sensor 208 uses a dual channel readout architecture. Thus, as described above with respect to FIGS. 2 and 5, the image sensor has a first channel (designated as Gr/Gb) and a second channel (designated as R/B) for processing the sampled and held pixels signals. Each readout channel G1/G2, R/B is used to read out half the number of pixels connected to the sample and hold and differential amplifier circuits 240. Once read out, the green analog reset and pixel signals pass through a differential amplifier 206 and an analog-to-digital converter (ADC) 208 before being processed as digital signals by the digital processing circuit 280. Once read out, the subtracted blue and red analog reset and pixel signals pass through a differential amplifier 205 and an analog-to-digital converter (ADC) 207 before being processed as digital signals by the digital processing circuit 280. Digital processing circuit 280 processes the pixel signals from array 200 to form an output image. Processing circuit 280 may be constructed as a pipeline architecture using digital logic circuits, or as a programmed processor, or as a combination of the two.

Figure 9:
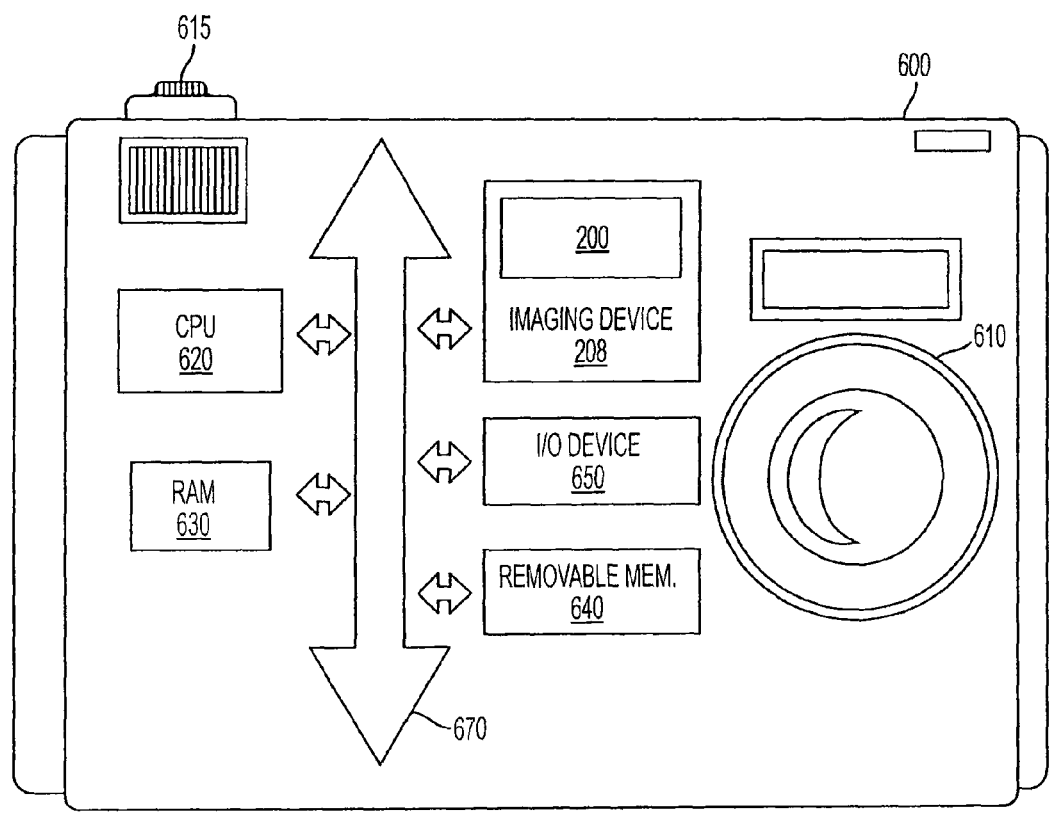
FIG. 9 is an example camera processor system incorporating at least one imaging device constructed in accordance with an embodiment of the disclosure.

FIG. 9 is a block diagram of a processing system, for example, a camera system 600 having a lens 610 for focusing an image on pixel array 200 of image sensor 208 when a shutter release button 615 is pressed. Although illustrated as a camera system, the system 600 may also be any type of imaging system including: a computer system, a process control system, or any other image acquisition and processing system employing a processor and associated memory. The system 600 includes a central processing unit (CPU) 620, e.g., a microprocessor, that communicates with the imaging device 208 and one or more I/O devices 650 over a bus 670. It must be noted that the bus 670 may be a series of buses and bridges commonly used in a processor system, but for convenience purposes only, the bus 670 has been illustrated as a single bus. The camera system 600 may also include random access memory (RAM) device 660 and some form of removable memory 640, such a flash memory card, or other removable memory as is well known in the art.

The above description and drawings illustrate various embodiments of the invention. These embodiments may be modified, changed or altered without departing from the spirit and scope of the invention

The invention claimed is:

1. A method of operating a pixel array comprising a plurality of pixels arranged in a plurality of rows and columns, each column of said pixel array having a corresponding column readout circuit, the method comprising:
   selecting groups of sequential columns for signal readout, wherein said selected groups are spaced apart from each other by non-selected columns in which no pixels are selected for readout, and integrating first, second, third, and fourth rows of pixels in said selected groups of sequential columns for at least first, second, third, and fourth integration periods, respectively; and
   reading out charge from the first row of pixels in said selected groups of sequential columns through each column's column readout circuit, and charge from the second, third, and fourth rows of pixels in said selected groups of sequential columns through column readout circuits corresponding to the non-selected columns.

2. The method of claim 1, wherein the selecting groups of sequential columns corresponds to a 4× skip mode readout of the pixel array.

3. The method of claim 1, wherein the first, second, third and fourth integration periods are not equal.

4. The method of claim 1, wherein for each two columns which are selected for readout, six columns are not selected for readout.

5. The method of claim 1, wherein the non-selected columns comprise first, second and third groups of non-selected columns, each group of non-selected columns having an equal number of columns to a number of columns in each group of sequential columns, and the second, third, and fourth rows of pixels are each read out through the column readout circuits of one of the first, second and third groups of non-selected columns.

6. The method of claim 5, wherein the second row of pixels is read out through the first group of non-selected columns, the third row of pixels is read out through the second group of non-selected columns, and the fourth row of pixels is read out through the third group of non-selected columns.

7. The method of claim 1, wherein the charge from the first row of pixels in said selected groups of sequential columns is read out after the first integration period, the charge from the second row of pixels is read out after the second integration period, the charge from the third row of pixels is read out after the third integration period, and the charge from the fourth row of pixels is read out after the fourth integration period.

8. The method of claim 1, wherein the pixel array is a color pixel array and the step of reading out charge comprises reading out green pixel signals through a first amplifier and a first analog to digital converter and reading out blue and red pixel signals through a second amplifier and second analog to digital converter.

9. The method of claim 1, wherein the first, second, third and fourth integration periods consist of four integration periods of unequal duration for increasing the dynamic range of the pixel array.

10. The method of claim 1, further comprising collecting and reading out charge using a rolling shutter procedure employing the first, second, third and fourth integration periods.

11. An imaging device comprising:
a pixel array comprising a plurality of pixels arranged in a plurality of rows and columns;
a plurality of readout circuits, one respectively associated with each column of pixels;
a timing circuit for operating pixels of the array, the timing circuit being operable to provide at least first, second, third and fourth integration periods for collecting charge representing an image during a same frame in the plurality of pixels of the pixel array; and
a switching circuit for:
coupling the readout circuits to the columns of pixels, the switching circuit being operable to select groups of sequential columns for signal readout, wherein said selected groups are spaced apart from each other by non-selected columns in which no pixels are selected for readout;
reading out, for at least the first integration period, some of the selected pixels in said selected groups of sequential columns through readout circuits corresponding to the selected columns; and
reading out, for at least the second integration period, some of the selected pixels in said selected groups of sequential columns through readout circuits corresponding to said non-selected columns;
reading out, for at least the third integration period, some of the selected pixels in said selected groups of sequential columns through readout circuits corresponding to said non-selected columns;
reading out, for at least the fourth integration period, some of the selected pixels in said selected groups of sequential columns through readout circuits corresponding to said non-selected columns.

12. The imaging device of claim 11, wherein the switching circuit is operable to read out a first selected row of pixel's in said selected groups of sequential columns through readout circuits corresponding to columns containing the pixels in the first selected row.

13. The imaging device of claim 11, wherein the switching circuit is operable to read out a second, third and fourth selected rows of pixels in said selected groups of sequential columns through readout circuits corresponding to non-selected columns.

14. The imaging device of claim 13, wherein the non-selected columns comprise first, second and third groups of non-selected columns, each group of non-selected columns having an equal number of columns to a number of columns in each group of sequential columns, and the second, third, and fourth rows of pixels are read out through the column readout circuits of the first, second and third groups of non-selected columns respectively.

15. The imaging device of claim 11, wherein the first, second, third and fourth integration periods are not equal.

16. The imaging device of claim 11, wherein each of the readout circuits comprise a sample and hold circuit and a differential amplifier.

17. The imaging device of claim 11, further comprising a first amplifier and a first analog-to-digital converter coupled to the switching circuit for reading out green pixel signals and a second amplifier and a second analog-to-digital converter coupled to the switching circuit for reading out blue and red pixel signals.

18. The imaging device of claim 11, wherein the groups of sequential columns comprise n columns, and each column in the pixel array is operatively connected by the switching circuit to both its corresponding column readout circuit and the column readout circuits corresponding to the nth, 2nth, and 3nth sequentially next columns.

19. An imaging device comprising:
a pixel array comprising a plurality of pixels arranged in a plurality of rows and columns;
a plurality of readout circuits, one respectively associated with each column of pixels;
a timing circuit for operating pixels of the array, the timing circuit being operable to provide at least first, second, third and fourth integration periods for collecting charge representing an image during the same frame in the plurality of pixels of the pixel array; and
a switching circuit for:
coupling the readout circuits to the columns of pixels, the switching circuit being operable to select groups of sequential columns for signal readout, wherein said selected groups are spaced apart by non-selected columns in which no pixels are selected for readout, and
reading out a first row of pixels in said selected groups of sequential columns after the first integration period through said readout circuits associated with said selected groups of sequential columns; and
reading out a second row of pixels in said selected groups of sequential columns after the second integration period through said readout circuits associated with a first group of non-selected columns;

reading out a third row of pixels in said selected groups of sequential columns after the third integration period through said readout circuits associated with a second group of non-selected columns; and reading out a fourth row of pixels in said selected groups of sequential columns after the fourth integration period through said readout circuits associated a third group of non-selected columns.

20. The imaging device of claim 19, wherein the switching circuit is further configured to repeat reading out first and second rows of pixels sequentially so that each row of pixels in the pixel array is read out for the first, second, third and fourth integration periods.

* * * * *

UNITED STATES PATENT AND TRADEMARK OFFICE
CERTIFICATE OF CORRECTION

PATENT NO. : 8,368,792 B2  
APPLICATION NO. : 13/097279  
DATED : February 5, 2013  
INVENTOR(S) : Chen Xu Page 1 of 1

It is certified that error appears in the above-identified patent and that said Letters Patent is hereby corrected as shown below:

In the Claims:

In column 16, line 10, in Claim 12, delete "pixel's" and insert -- pixels --, therefor.

Signed and Sealed this
Thirtieth Day of April, 2013

Teresa Stanek Rea
*Acting Director of the United States Patent and Trademark Office*